US012794648B2

(12) United States Patent
Kim

(10) Patent No.: US 12,794,648 B2
(45) Date of Patent: Nov. 10, 2026

(54) BASE STATION, DISTRIBUTED UNIT, RADIO UNIT, AND SCHEDULING METHOD

(71) Applicant: SK TELECOM CO., LTD., Seoul (KR)

(72) Inventor: Kang Ho Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 310 days.

(21) Appl. No.: 18/584,213

(22) Filed: Feb. 22, 2024

(65) Prior Publication Data

US 2024/0421965 A1 Dec. 19, 2024

(30) Foreign Application Priority Data

Jun. 13, 2023 (KR) ........................ 10-2023-0075633

(51) Int. Cl.

| | |
|---|---|
| ***H04L 5/00*** | (2006.01) |
| ***H04W 72/1268*** | (2023.01) |
| ***H04W 72/1273*** | (2023.01) |
| ***H04W 72/541*** | (2023.01) |

(52) U.S. Cl.

CPC ....... *H04L 5/0073* (2013.01); *H04W 72/1268* (2013.01); *H04W 72/1273* (2013.01); *H04W 72/541* (2023.01)

(58) Field of Classification Search

CPC .............. H04L 5/0073; H04W 72/541; H04W 72/1268; H04W 72/1273

See application file for complete search history.

(56) References Cited

U.S. PATENT DOCUMENTS

| | | | | |
|---|---|---|---|---|
| 2021/0243839 | A1* | 8/2021 | Krishnaswamy | ..... H04W 24/04 |
| 2023/0118482 | A1* | 4/2023 | Chakraborty | ...... H04B 7/18539 |
| 2024/0284460 | A1* | 8/2024 | Abdelghaffar | ...... H04W 72/232 |

FOREIGN PATENT DOCUMENTS

| | | | | |
|---|---|---|---|---|
| JP | 2004-260845 | A | 9/2004 | |
| JP | WO2017/183284 | A1 | 2/2019 | |
| JP | 2022-540261 | A | 9/2022 | |
| WO | 2011/033748 | A1 | 3/2011 | |
| WO | WO-2015174892 | A1 * | 11/2015 | ............ H04W 72/51 |

OTHER PUBLICATIONS

Office Action issued on Jul. 8, 2025, for corresponding Japanese Patent Application No. 2024-015523, along with an English machine translation (5 pages).

Japanese Office Action dated Jan. 24, 2025 for corresponding Japanese Patent Application No. 2024-015523, with English machine translation (5 pages).

* cited by examiner

*Primary Examiner* — Duc C Ho

(74) *Attorney, Agent, or Firm* — Hauptman Ham, LLP

(57) ABSTRACT

The disclosure provides a new scheme that embodies detailed technical configurations that schedule traffic (downlink/uplink) in units of groups in each cell and determine an allocation order of resources (sub-frames, slots, RBs) in a group to be different for each cell, so that inter-cell scheduling occupancy rate is distributed and inter-cell interference is avoidable.

9 Claims, 11 Drawing Sheets

| Slot Idx (N_DL = 5) | Interference Level | allocation order |
|---|---|---|
| 0 | 23 | 2 |
| 1 | 55 | 3 |
| 2 | 12 | 1 |
| 3 | 99 | 5 |
| 4 | 72 | 4 |

| Slot Idx (N_DL = 5) | Transmission success rate for each slot | Existing allocation order | Updated allocation order |
|---|---|---|---|
| 0 | 90% | 2 | 2 |
| 1 | 88% | 3 | 3 |
| 2 | 92% | 5 | 1 |
| 3 | 75% | 1 | 5 |
| 4 | 86% | 4 | 4 |

BASE STATION, DISTRIBUTED UNIT, RADIO UNIT, AND SCHEDULING METHOD

CROSS-REFERENCE TO RELATED APPLICATION(S)

This application is based on and claims priority under 35 U.S.C. 119 to Korean Patent Application No. 10-2023-0075633, filed on Jun. 13, 2023, in the Korean Intellectual Property Office, the disclosure of which is herein incorporated by reference in its entirety.

BACKGROUND OF THE INVENTION

1. Field of the Invention

The disclosure relates to a technique for avoiding inter-cell interference.

2. Description of the Prior Art 5G has a lean-carrier design, and thus downlink/uplink performance may be dramatically affected by interference when compared to LTE in which a cell-specific reference signal (CRS) is always transmitted.

The leading cause of interference is an inter-cell interference, which is the case in which a downlink signal that a neighboring cell transmits affects downlink signal reception of a user equipment (UE) that is located in a serving cell and the case in which an uplink signal that a UE located in a neighboring cell transmits affects UL reception of a serving cell.

Therefore, research and development of technology that minimizes inter-cell interference is one of the important subject matters.

An existing scheduling scheme of a base station sequentially allocates resources from the earliest slot or sub-frame in which downlink or uplink scheduling is available when data to be transmitted is delivered from a higher layer or when an uplink scheduling request is received from a UE.

The existing scheduling scheme described above may seem to be efficient. However, the existing scheduling scheme is inefficient from the perspective of inter-cell interference by a neighboring cell.

Particularly, in a TDD system, a scheduling occupancy rate of a first downlink slot (or sub-frame) or a first uplink slot (or sub-frame) is higher than those of other slots (or sub-frames) according to the existing scheduling scheme.

Therefore, according to the existing scheduling scheme, there is a drawback in that inter-cell interference frequently/highly occurs in a first downlink slot (or sub-frame) or in a first uplink slot (or sub-frame) of which the scheduling occupancy rate is higher than those of other slots (or sub-frames).

The disclosure provides a new technical scheme that distributes a scheduling occupancy rate to overcome the drawback of the existing scheduling scheme having a high scheduling occupancy rate at the same location (e.g., a first downlink/uplink slot) among the cells.

SUMMARY OF THE INVENTION

An aspect of the disclosure is to provide a new technical scheme that distributes a scheduling occupancy rate beyond an existing scheduling scheme having a feature of a high cell scheduling occupancy rate at the same location (e.g., a first downlink/uplink slot) among cells.

A base station according to an embodiment of the disclosure may include a processor and a memory storing instructions thereon, the instructions when executed by the processor may cause the processor to allocate traffic for each group of unit resources previously configured for a cell; and determine an allocation order of unit resources in the each group to be different to avoid inter-cell interference in the cell when allocating traffic for the each group.

A distributed unit (DU) according to an embodiment of the disclosure may include a processor and a memory storing instructions thereon, the instructions when executed by the processor may cause the processor to allocate traffic for each group of unit resources previously configured for a cell; and determine an allocation order of unit resources in the each group according to inter-cell interference in the cell when allocating traffic for the each group.

Specifically, when allocating traffic for the each group, the processor may determine the allocation order of unit resources in the each group by using an interference level of each unit resource measured for the cell.

Specifically, the processor may identify the interference level of each unit resource in the each group that is obtained based on the interference level of each unit resource measured by a radio unit (RU) of the cell, and may determine, based on the interference level of each unit resource in the each group, the allocation order of unit resources in the each group when allocating traffic for the each group.

Specifically, the processor may sequentially determine the allocation order of unit resources in an ascending order of interference levels from a unit resource having a lowest interference level based on the interference level of each unit resource in the each group.

Specifically, the unit resource may be a sub-frame, each slot in a subframe, or a resource block (RB) in a slot.

A radio unit (RU) interworking with a distributed unit (DU) according to an embodiment of the disclosure may include a processor and a memory storing instructions thereon, the instructions when executed by the processor may cause the processor to measure an interference level of unit resource; and transfer information related to the measurement to the DU, so that the DU that allocates traffic for each group of unit resources previously configured for a cell of the RU determines an allocation order of unit resources in the each group by using the information related to the measurement when allocating traffic for the each group.

Specifically, the information related to the measurement may be information obtained by measuring an interference level of unit resource; or information obtained by calculating an interference level of unit resource in the each group using the measured interference level of unit resource.

A scheduling method performed by a base station according to an embodiment of the disclosure may include an operation of allocating traffic for each group of unit resources previously configured for a cell, and the operation may determine an allocation order of unit resources in the each group to be different in order to avoid inter-cell interference in the cell when allocating traffic for each group.

A scheduling method performed by a distributed unit (DU) according to the disclosure may include an operation of allocating traffic for each group of unit resources previously configured for a cell, and the operation may determine an allocation order of unit resources in the each group according to inter-cell interference in the cell when allocating traffic for the each group.

Specifically, the operation may determine the allocation order of unit resources in the each group by using an interference level of each unit resource measured for the cell when allocating traffic for the each group.

According to an embodiment of the disclosure, a detailed technical configuration is embodied that schedules traffic (downlink/uplink) in units of groups in each cell and determines and schedules an allocation order of resources (sub-frames, slots, RBs) in a group to be different for each cell.

Accordingly, the disclosure may distribute a scheduling occupancy rate among cells, avoid inter-cell interference, and improve downlink/uplink transmission performance, beyond the existing scheduling scheme having a feature of a high cell scheduling occupancy rate at the same location (e.g., a first downlink/uplink slot) among cells.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the disclosure are described with reference to the accompanying drawings.

The disclosure relates to a technique for avoiding inter-cell interference.

5G has a lean-carrier design, and thus downlink/uplink performance may be dramatically affected by interference when compared to LTE in which a cell-specific reference signal (CRS) is always transmitted.

The leading cause of interference is the case in which a downlink signal that a neighboring cell transmits affects downlink signal reception by a user equipment (UE) that is located in a serving cell and the case in which an uplink signal that a UE located in a neighboring cell transmits affects UL reception by a serving cell, that is, an inter-cell interference situation.

Figure 1:
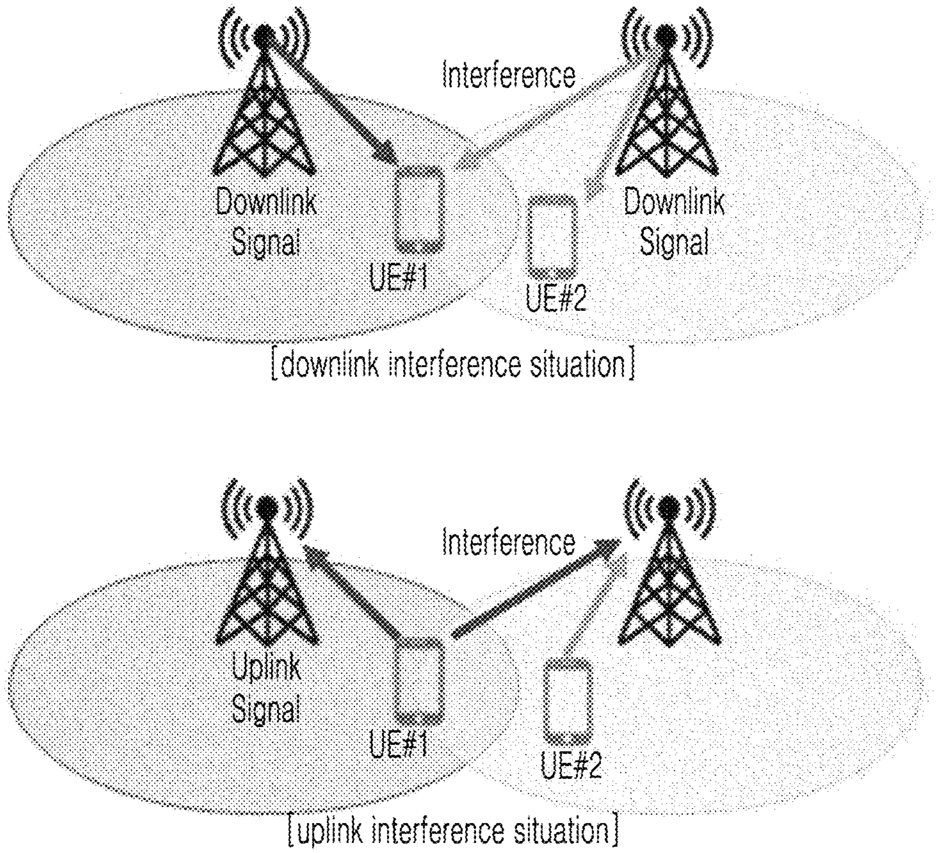
FIG. 1 is a diagram illustrating an inter-cell interference situation.

FIG. 1 illustrates an inter-cell interference situation.

As shown in FIG. 1, in the case of a downlink, a downlink interference situation may occur in which a DL signal for UE #2 acts as interference with UE #1.

In the case of an uplink, an uplink interference situation may occur in which a UL signal of UE #1 acts as interference with reception of a UL signal of UE #2.

Therefore, research and development of technology that minimizes inter-cell interference is one of the important subject matters.

An existing scheduling scheme of a base station sequentially allocates resources from the earliest slot or sub-frame in which downlink or uplink scheduling is available when data to be transmitted is delivered from a higher layer or when an uplink scheduling request is received from a user equipment (UE).

The existing scheduling scheme described above may seem to be efficient. However, it is difficult to say that the existing scheduling scheme is efficient from the perspective of inter-cell interference in the state in which a neighboring cell is present.

Particularly, in a TDD system, according to the existing scheduling scheme, a scheduling occupancy rate of a first downlink slot (or sub-frame) or a first uplink slot (or sub-frame) is higher than those of other slots (or sub-frames).

Downlink data may not be transmitted during uplink transmission, and thus data transferred from a higher layer is buffered and transmitted at a first coming DL schedulable location (i.e., a first downlink slot (or sub-frame)) (it is equally applied in the case of UL scheduling).

Therefore, according to the existing scheduling scheme, there is a drawback in that inter-cell interference frequently/highly occurs in a first downlink slot (or sub-frame) or in a first uplink slot (or sub-frame) of which the scheduling occupancy rate is higher than those of other slots (or sub-frames).

The disclosure desires to embody a new technical scheme that distributes a scheduling occupancy rate beyond the existing scheduling scheme having a feature of a high cell scheduling occupancy rate at the same location (e.g., a first downlink/uplink slot) among cells.

Specifically, it is desired to embody the new technical scheme (scheduling scheme) that schedules traffic (downlink/uplink) in units of groups in each cell and determines and schedules an allocation order of resources (sub-frames, slots, RBs) in a group to be different for each cell, so as to distribute a scheduling occupancy rate.

Hereinafter, with reference to FIG. 2, configurations of a distributed unit (DU) and a radio unit (RU) that embody a technical scheme provided in the disclosure, that is, a new scheduling scheme, will be described in detail.

Before providing a detailed description, the disclosure may be applicable to legacy 4G (LTE), 5G (NR), future 6G, and the like, may be applicable to both a time division duplex (TDD) system and a frequency division duplex (FDD) system, and may be applicable to both a legacy radio access network (RAN) system and an open RAN (O-RAN) system.

The subject matter of the disclosure is to embody a scheme that minimizes inter-cell interference by allocating slots (or sub-frames) and/or RBs in a different order for each cell. In addition, the disclosure is to provide an operation of an RU in order to effectively determine an allocation order.

Hereinafter, for ease of description, the features and various embodiments of the disclosure will be described based on the 5G (NR) standard.

Figure 2:
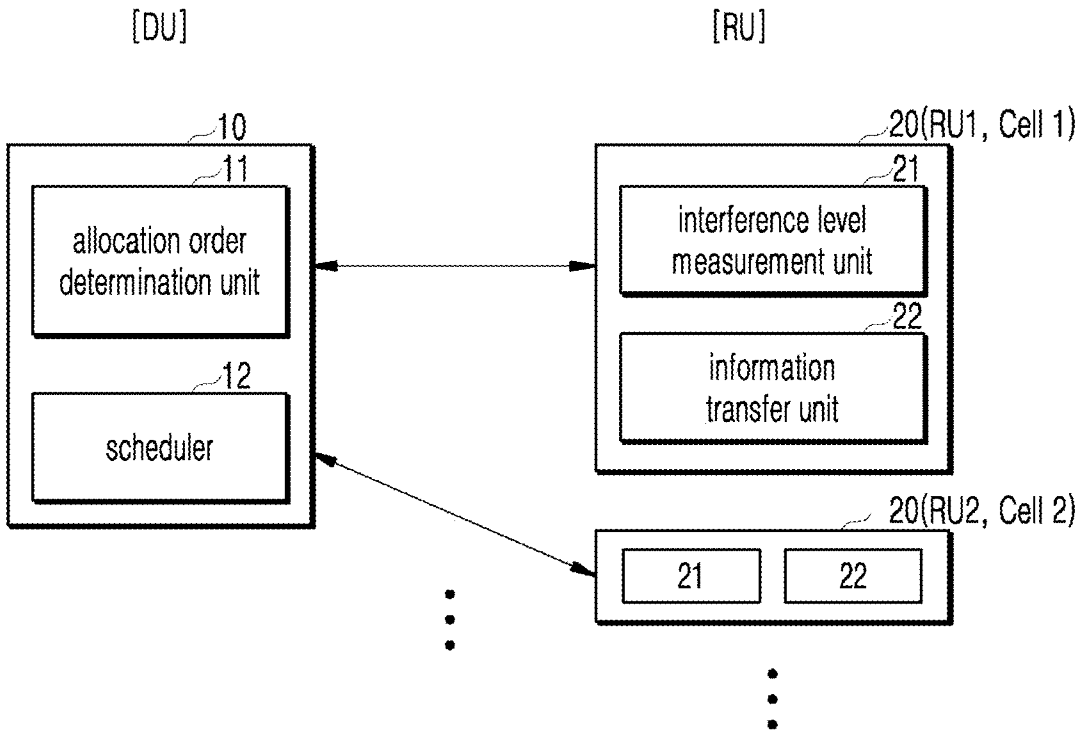
FIG. 2 is a diagram illustrating configurations of a DU and an RU according to an embodiment of the disclosure.

FIG. 2 illustrates the configuration of a distributed unit 10 (DU 10) and the configuration of a radio unit 20 (RU 20) according to an embodiment of the disclosure.

A base station may be configured with the DU 10 and the RU 20.

Therefore, the base station to which the disclosure is applied may be configured with a memory (not illustrated) including an instruction, and a processor (corresponding to the DU 10 and/or RU 20 in FIG. 2) that implements the instruction so as to allocate traffic for each group of unit resources configured for a cell and to determine an allocation order of unit resources in a group to be different in order to avoid inter-cell interference in the cell when allocating traffic for each group.

Hereinafter, the configuration of the DU 10 and the configuration of the RU 20 according to an embodiment of the disclosure will be described in detail.

First, the DU 10 according to an embodiment of the disclosure will be described with reference to FIG. 2.

The DU 10 according to an embodiment of the disclosure may be configured with a memory (not illustrated) including an instruction, and a processor (hereinafter, described as an allocation order determination unit 11 and a scheduler 12) that implements the instruction so as to allocate traffic for each group of unit resources previously configured for a cell and to determine an allocation order of unit resources in a group according to inter-cell interference in the cell when allocating traffic for each group.

More specifically, the DU 10 may allocate traffic for each group of unit resources previously configured for each cell (e.g., cell 1, 2, . . . ) of each RU 20 (e.g., RU 1, 2, . . . ) that interoperates with the DU 10.

Here, a unit resource may be a subframe, each slot in a sub-frame, or each resource block (RB) in a slot.

That is, the scheduler 12 included in the DU 10 of the disclosure may allocate traffic for each group of sub-frames, slots, or RBs with respect to each cell (e.g., cell 1, 2, . . . ) interoperating with the DU 10.

In the following description, a unit resource is considered as a slot for ease of description, and a description will be provided on the assumption of an embodiment that allocates traffic for each group of slots.

That is, the scheduler 12 included in the DU 10 may allocate DL/UL traffic for each group of slots with respect to each cell (e.g., cell 1, 2, . . . ) interoperating with the DU 10.

Therefore, according to the disclosure, while traffic associated with an $N^{th}$ group is transmitted, traffic to be transmitted in an $(N+1)^{th}$ group is collected and buffered.

A group of slots described in the disclosure may be configured as follows.

FDD system: grouping according to the number of consecutive slots previously configured (configurable separately for DL/UL).

Tdd System:

1) grouping consecutive slots of the same type
2) grouping according to the number of consecutive slots previously configured (configurable separately for DL/UL).

Figure 3:
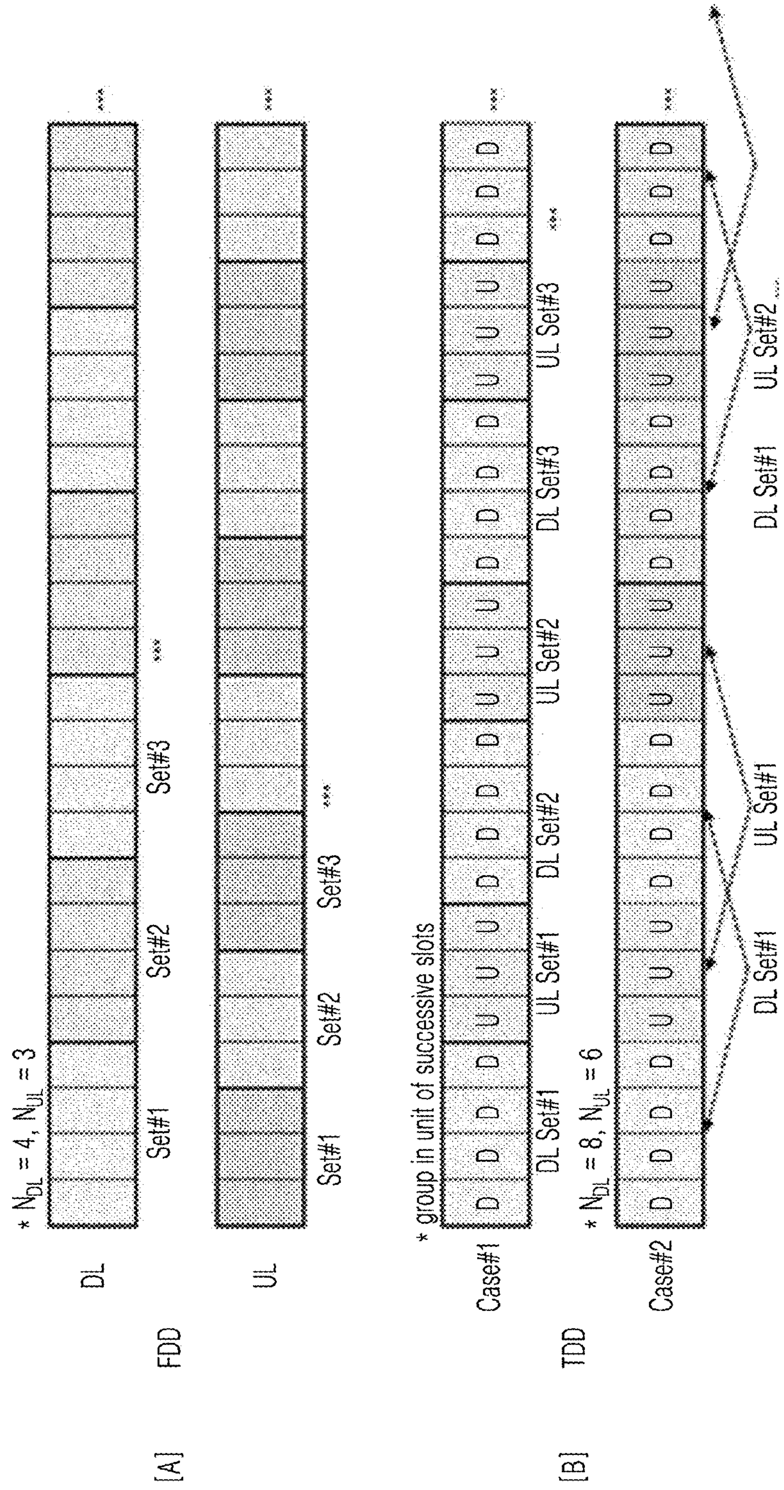
FIG. 3 is a diagram illustrating an example of the configuration of a group of unit resources (e.g., slots) described in the disclosure.

In association with the above, FIG. 3 illustrates an example of the configuration of a group described in the disclosure.

With reference to FIG. 3, in the case of an FDD system, there is provided an example of configuring consecutive slots as a single group (set #1, #2, #3, . . . ), such as 4 consecutive DL slots and 3 consecutive UL slots.

In the case of a TDD system, there is provided an example of the above-described scheme} 1) an} 2) of configuring a group.

The above-described scheme 1) is a scheme (Case #1) of bundling/configuring consecutive slots of the same type as a single group (set).

The above-described scheme 2) is a scheme (case #2) of configuring consecutive slots based on the previously configured number of consecutive slots as a single group (set) in the same manner as the FDD system, and FIG. 3 illustrates an example of bundling/configuring consecutive slots as a single group (set) such as 8 DL slots and 6 UL slots.

As illustrated in FIG. 3, in the TDD system, DL slots and UL slots are present together and there may be an interval between slots in a bundle, which is different from the FDD system.

Accordingly, a base station to which the disclosure is applied, particularly, the DU 10 in the base station, may allocate/schedule DL/UL traffic in units of groups described in the disclosure with respect to each cell (e.g., cell 1, 2, . . . ) interoperating with the base station.

Specifically, when allocating/scheduling DL or UL traffic of an $N^{th}$ group, the DU 10 may buffer data to be transmitted in an $(N+1)^{th}$ group.

In case that transmission of the $N^{th}$ group is completed, the DU 10 allocates/schedules data that is buffered in advance, that is, DL or UL traffic of the $(N+1)^{th}$ group.

Specifically, in the above-description of a scheme of allocating/scheduling DL/UL traffic in units of groups of slots (or sub-frames or RBs), the disclosure provides a scheme of determining an allocation order of slots (or sub-frames or RBs) in a group to be different in order to avoid inter-cell interference.

To this end, the allocation order determination unit 11 included in the DU 10 of the disclosure performs a function of determining an allocation order of unit resources, that is, slots (or sub-frames or RBs) in a group according to inter-cell interference in a cell, when allocating traffic for each group of slots (or sub-frames or RBs) as described above.

Hereinafter, in the same manner as the above-described embodiment, a description will be provided on the assumption of an embodiment that considers a unit resource as a slot for ease of description and determines an allocation order of slots in a group.

According to a detailed description of an embodiment, the allocation order determination unit 11 may determine an allocation order of slots in a group by using an interference level for each slot measured for each cell (e.g., cell 1, 2, . . . ) when allocating traffic for each group with respect to each cell (e.g., cell 1, 2, . . . ) interoperating with the DU 10.

In a description provided with reference to cell 1 configured by RU 1 20 among the cells (e.g., cell 1, 2, . . . ) illustrated in FIG. 2, the allocation order determination unit 11 may determine an allocation order of slots in a group by using an interference level for each slot measured in the corresponding cell 1 when allocating traffic for each group with respect to cell 1.

More particularly, the allocation order determination unit 11 may identify an interference level for each slot in a group that is obtained based on an interference level for each slot measured by an RU (hereinafter, RU 1 20) of a cell (hereinafter, cell 1), and may determine an allocation order of respective slots in a group based on the identified interference level for each slot in the group when allocating traffic for each group.

Hereinafter, embodiments associated with a method of determining an allocation order of slots in a group will be described.

The embodiment is basically a scheme of determining an allocation order of slots in a group by using an interference level for each slot measured/transferred by an RU.

Particularly, according to a first embodiment, an RU (hereinafter, RU 1 20) in the disclosure may measure an interference level for each unit resource (e.g., a slot) and may transfer information related to the measurement to the DU 10.

In this instance, the "information" transferred to the DU 10 may be information that RU 1 20 obtains by measuring an interference level for each slot.

That is, for example, RU 1 20 may measure an interference level for each slot in its cell 1 and may transfer the measurement information to the DU 10 periodically, upon detection of a change in a surrounding environment, or by the request of the DU 10.

In this instance, the DU 10 may use interference level measurement information of each slot transferred from RU 1 20, and may calculate an interference level average value for each slot index in a group based on group configuration information associated with cell 1 of the corresponding RU 1 20, thereby calculating/obtaining an interference level for each slot in a group.

Accordingly, based on the interference level for each slot in the group which is obtained via the above-described average calculation, the DU 10 (the allocation order determination unit 11) may determine an allocation order of slots in the group in an ascending order of interference levels from a unit resource having the lowest interference level, that is, a slot having the lowest interference level.

According to a second embodiment, an RU (hereinafter, RU 1 20) in the disclosure may measure an interference level for each unit resource (e.g., a slot) and may transfer information related to the measurement to the DU 10.

In this instance, the "information" transferred to the DU 10 may be information that RU 1 20 obtains by measuring an interference level for each slot and calculating an interference level average value for each slot index in a group for its cell 1.

That is, for example, RU 1 20 may be aware of group configuration information associated with its cell 1 by obtaining the group configuration information from the DU 10.

RU 1 20 may measure an interference level for each slot in its cell 1 and may calculate an interference level average value for each slot index in a group based on the group configuration information for its cell 1, thereby calculating/obtaining an interference level for each slot in the group.

Accordingly, RU 1 20 may transfer, to the DU 10, the interference level information for each slot with respect to cell 1, which is obtained via measurement and average calculation as describe above, periodically, upon detection of a change in a surrounding environment, or by the request of the DU 10.

Accordingly, based on the interference level for each slot in the group that is obtained from RU 1 20, the DU 10 (the allocation order determination unit 11) may determine an allocation order of slots in the group in an ascending order of interference levels from a unit resource having the lowest interference level, that is, a slot having the lowest interference level.

Accordingly, when allocating/scheduling DL/UL traffic in units of groups with respect to cell 1, the DU 10 (scheduling unit 12) may allocate/schedule DL/UL traffic according to an allocation order of slots in a group determined by the allocation order determination unit 11.

In the above-described second embodiment, more particularly, RU 1 20 may directly determine an allocation order of slots in a group based on an interference level for each slot with respect to cell 1 obtained via measurement and average calculation, and may transfer, to the DU 10, the determined allocation order to the DU 10 periodically, upon detection of a change in a surrounding environment, or by the request of the DU 10.

In this instance, when allocating/scheduling DL/UL traffic in units of groups with respect to cell 1, the DU 10 (scheduling unit 12) may allocate/schedule DL/UL traffic according to the allocation order of slots in the group transferred from RU 1 20.

Accordingly, with respect to each cell (cell 1, 2, . . . ), DU 10 in the disclosure buffers data to be transmitted in an $(N+1)^{th}$ group when allocating/scheduling DL or UL traffic in an $N^{th}$ group. When transmission associated with the $N^{th}$ group is completed, DU 10 may allocate/schedule the buffered data, that is, DL or UL traffic of the $(N+1)^{th}$ group, according to the allocation order of slots in the group determined for the corresponding cell.

Subsequently, the RU 20 according to an embodiment of the disclosure will be described with reference to FIG. 2.

RU 20 according to an embodiment of the disclosure may include a memory (not illustrated) including an instruction, and may include a processor (hereinafter, the interference level measurement unit 21 and information transfer unit 22) that implements the instruction so as to measure an interference level for each unit resource and transfer information related to the measurement to the DU 10, so that the DU 10, which allocates traffic for each group of unit resources previously configured for a cell of the RU 20, is enabled to determine an allocation order of unit resources in the group by using the information when allocating traffic for each group.

In the following description, a unit resource is considered as a slot for ease of description, and a description will be provided on the assumption of an embodiment that allocates traffic for each group of slots.

The interference level measurement unit 21 may measure an interference level for each slot in a cell of the RU 20.

The information transfer unit 22 may transfer, to the DU 10, information related to the interference level for each slot measured by the interference level measurement unit 21 periodically, upon detection of a change of a surrounding environment, or by the request of the DU 10.

As described in the first embodiment, the "information" transferred to the DU 10 may be information that the RU 20 (the interference level measurement unit 21) obtains by measuring an interference level for each slot.

In the case of the first embodiment, the DU 10 may use interference level measurement information for each slot transferred from the RU 20, and may calculate an interference level average value for each slot index in a group based on group configuration information of a cell of the corresponding RU 20, thereby calculating/obtaining an interference level for each slot in the group.

Accordingly, based on the interference level for each slot in the group that is obtained via the above-described average calculation with respect to the cell of RU 20, the DU 10 may sequentially determine an allocation order of slots in the group in an ascending order of interference levels from a unit resource having the lowest interference level, that is, a slot having the lowest interference level.

As described in the second embodiment, the "information" transferred to the DU 10 may be information that the RU 20 obtains by measuring an interference level for each slot and calculating an interference level average value for each slot index in a group for its cell.

In the case of the second embodiment, based on the interference level for each slot in the group that is transferred from the RU 20 with respect to the cell of RU 20, the DU 10 may determine an allocation order of slots in the group in an ascending order of interference levels from a unit resource having the lowest interference level, that is, a slot having the lowest interference level.

Accordingly, with respect to each cell (cell 1, 2, . . . ), DU 10 in the disclosure buffers data to be transmitted in an $(N+1)^{th}$ group when allocating/scheduling DL or UL traffic in an $N^{th}$ group. When transmission associated with the $N^{th}$ group is completed, DU 10 may allocate/schedule the buffered data, that is, DL or UL traffic of the $(N+1)^{th}$ group, according to an allocation order of slots in the group determined for the corresponding cell.

Figure 4A:
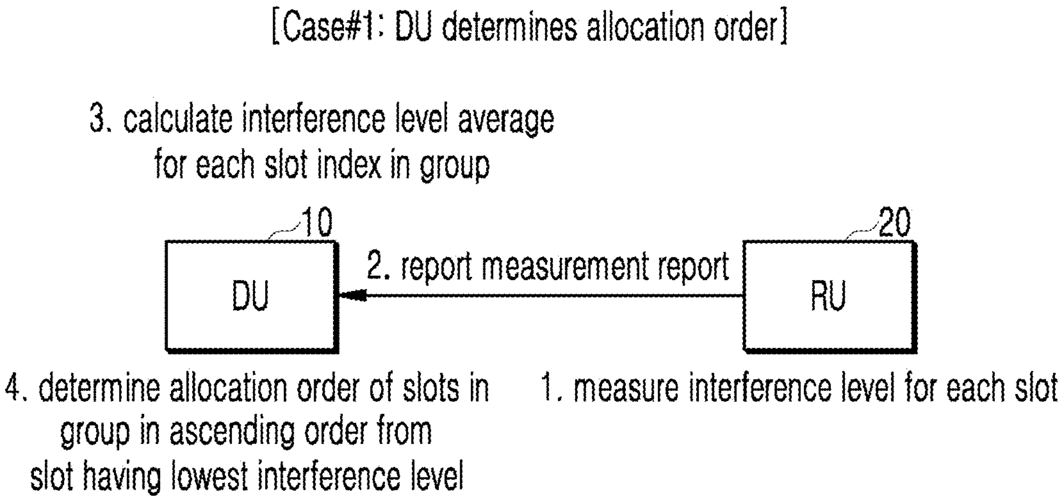
FIG. 4A is a diagram illustrating an embodiment that performs scheduling by using an interference level for each unit resource (e.g., a slot) in a group according to the disclosure.
Figure 4B:
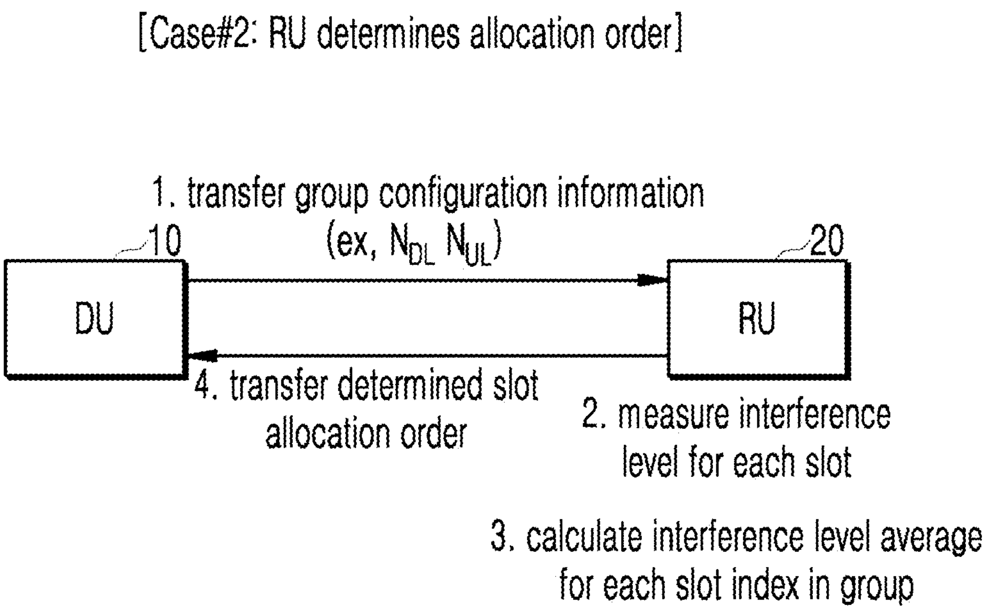
FIG. 4B is a diagram illustrating an embodiment that performs scheduling by using an interference level for each unit resource (e.g., a slot) in a group according to the disclosure.

FIG. 4A is a diagram illustrating an embodiment of performing scheduling by using an interference level for each unit resource (e.g., a slot) in a group according to the disclosure, and FIG. 4B is a diagram illustrating an embodiment of performing scheduling by using an interference level for each unit resource (e.g., a slot) in a group according to the disclosure.

Case #1 illustrated in FIG. 4A is an embodiment in which the DU 10 determines an allocation order of slots in a group, which corresponds to the above-described first embodiment.

According to a description, 1. the RU 20 measures an interference level for each slot, and 2. transfers the same to the DU 10. 3. The DU 10 processes (e.g., average calculation) the received interference level for each slot transferred based on group configuration information associated with the cell of the RU 20, and 4. determines an allocation order of slots in the group.

Case #2 illustrated in FIG. 4B is an embodiment in which the RU 20 determines an allocation order of slots in a group, which corresponds to the above-described second embodiment.

According to a description, 1. the DU 10 transfers group configuration information to the RU 20 in advance, 2. the RU 20 measures an interference level for each slot, and 3. processes (e.g., average calculation) the measured interference level for each slot, and may determine an allocation order of the slots in the group, and 4. the RU 20 may transfer, to the DU 10, the determined allocation order of the slots in the group.

Figure 5:
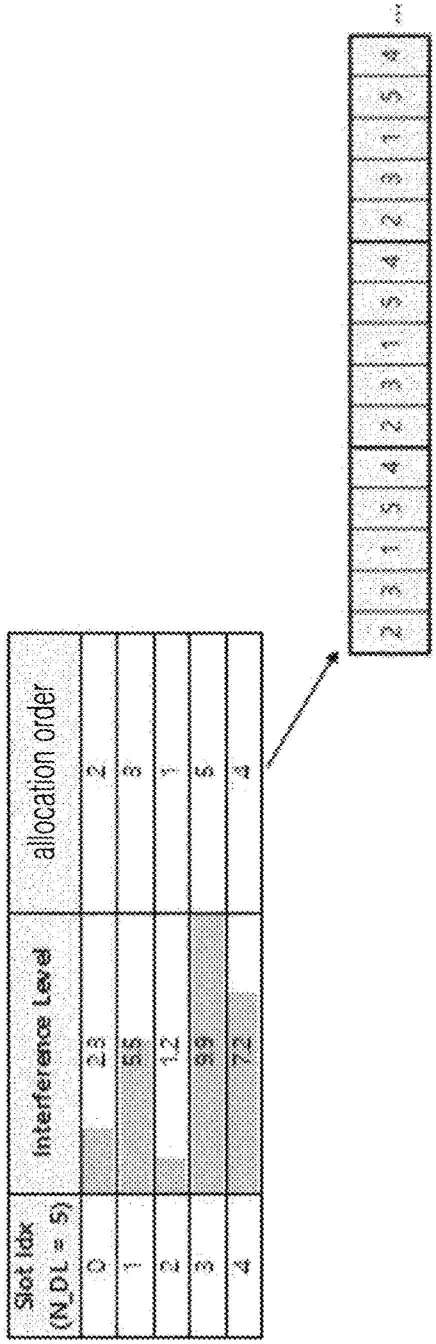
FIG. 5 is a diagram illustrating an example of determining an allocation order by using an interference level for each unit resource (e.g., a slot) in a group according to the disclosure.

FIG. 5 is a diagram illustrating an example of determining an allocation order by using an interference level for each unit resource (e.g., a slot) in a group according to the disclosure.

That is, how an allocation order of slots is determined according to an interference level of slots in a group in the above-described first and second embodiments is described as an example.

According to an embodiment of FIG. 5, there is provided the case in which 5 slots are configured as a single group in DL.

Accordingly, as illustrated in FIG. 5, based on an interference level for each slot in a group that is obtained via interference level processing (e.g., average calculation) for each slot, a slot (index 2) having the lowest interference level is assigned with a first turn in the allocation order and a second turn, a third turn, a fourth turn, and a fifth turn in the allocation order may be assigned to respective slots (index 0→1→4→3) in an ascending order of interference levels.

The fact that an interference level is low refers to the fact that the frequency of data transmission of an adjacent cell is low in the corresponding slot. Such an interference level for each slot may be measured/processed/obtained to be different for each cell (e.g., cell 1, 2, . . . )

That is, with respect to each cell (e.g., cell 1, 2, . . . ), based on an interference level for each slot in a group that is obtained via interference level processing (e.g., average calculation) for each slot, the disclosure may use a scheme of scheduling data preferentially in a slot having the lowest interference level, and thus a scheduling occupancy rate is distributed among cells as opposed to being concentrated in the same location (e.g., a first downlink/uplink slot) and the probability of occurrence of inter-cell interference may be reduced.

Figure 6:
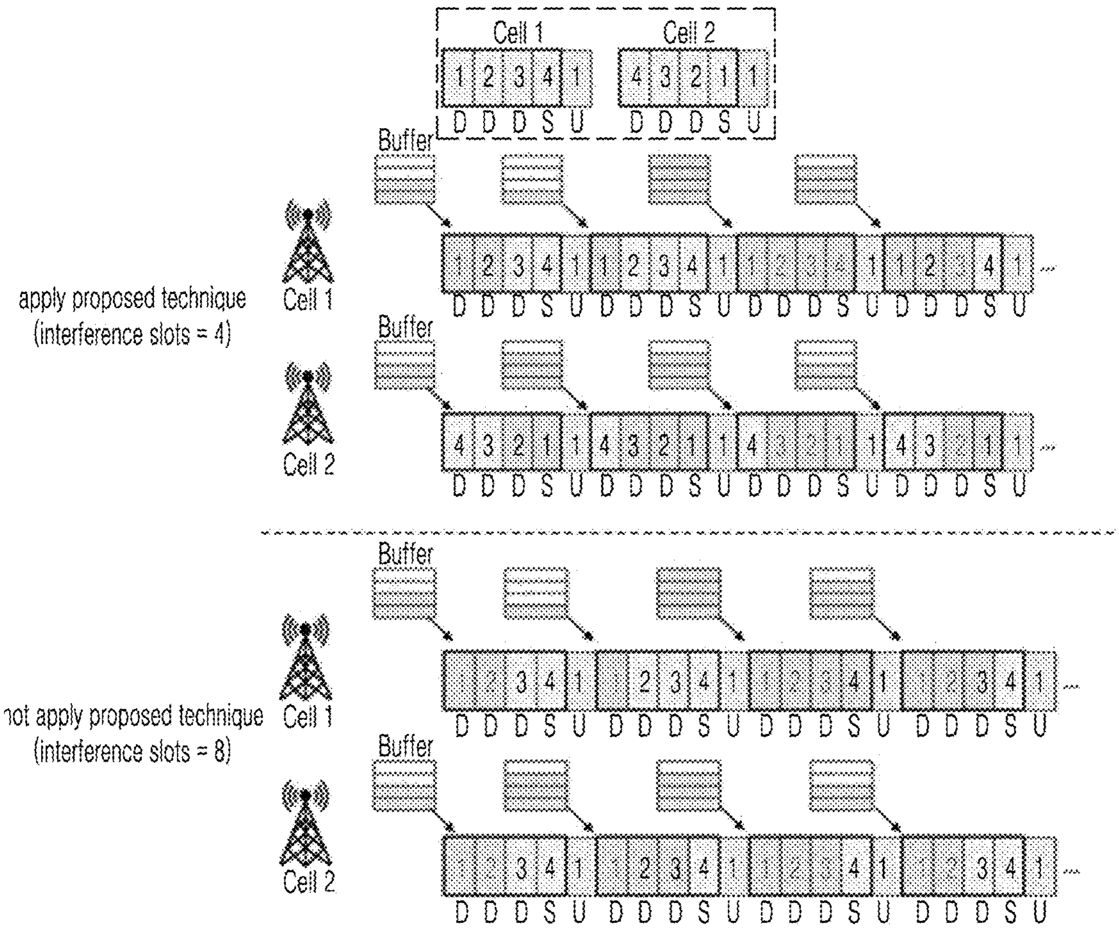
FIG. 6 is a diagram illustrating inter-cell interference avoidance effect obtained by applying the disclosure.

FIG. 6 is a diagram illustrating inter-cell interference avoidance effect obtained by applying the disclosure.

FIG. 6 illustrates an existing situation to which the "proposed technique of the disclosure is not applied". As shown in the drawing, in cells 1 and 2, in the case of a DL, data transferred from an uplink transmission higher layer is buffered and the data is scheduled and transmitted from a first slot in which DL transmission is available.

Accordingly, in both cells 1 and 2 which are close to each other, a scheduling occupancy rate is high in the same location (e.g., a first DL slot), and thus it is identified that there is a high possibility of interference occurring in 8 DL slots between cell 1 and cell 2

Further, FIG. 6 illustrates a situation to which the "proposed technique (e.g., 4 DL slots are configured as a single group) of the disclosure is applied".

As shown above, in cell 1 and cell 2, an interference level for each slot is measured/processed/obtained to be different, and thus an allocation order of slots in a group may be determined to be different and may be utilized for scheduling.

Therefore, according to the disclosure, in cells 1 and 2, in the case of a DL, data transferred from an uplink transmission higher layer is buffered and data is scheduled and transmitted from a first slot in which DL transmission is available in the same manner as the existing scheme. However, an allocation order of slots in a group is different for each cell, and thus a scheduling occupancy rate is distributed among cells, as opposed to being concentrated on the same location (e.g., a first DL slot), and thus it is identified that the possibility of occurrence of inter-cell interference (8 DL slots→4 DL slots) is reduced.

In addition, the disclosure may be extended to a scheme of determining an allocation order of RBs in each slot, as well as an allocation order of slots in a group.

Figure 7:
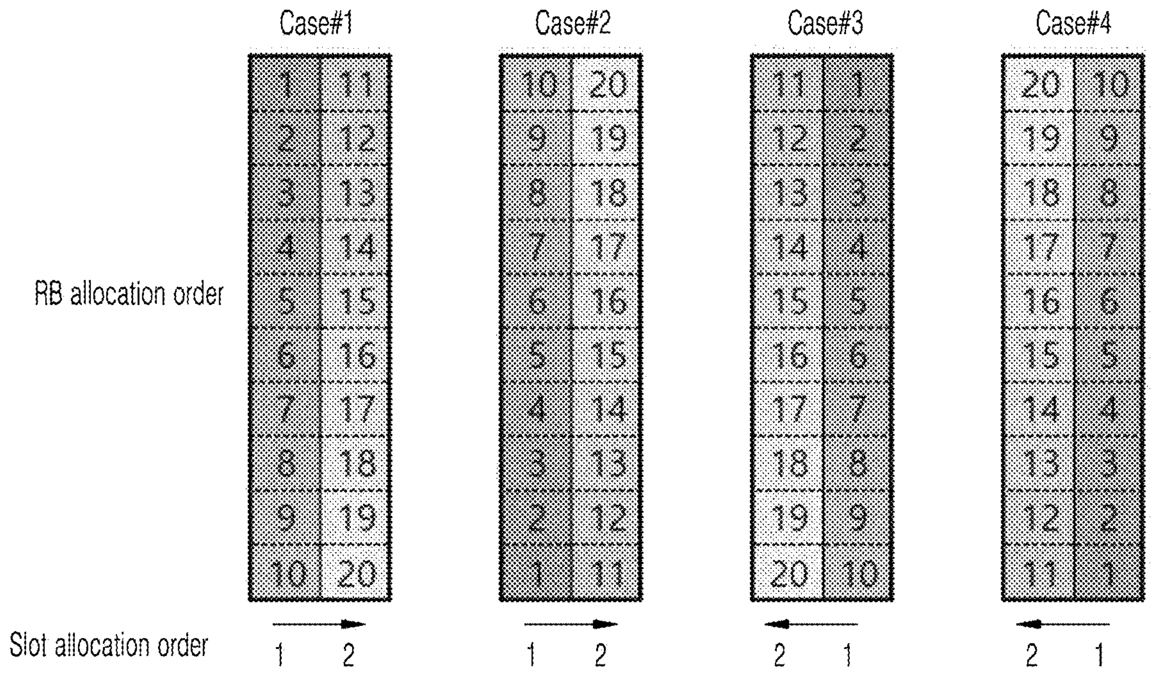
FIG. 7 is a diagram illustrating an embodiment that applies an RB as a unit resource in the disclosure.

For example, FIG. 7 illustrates an embodiment of determining an allocation order of RBs to be different in a slot although an allocation order of slots in a group is the same according to the disclosure.

As illustrated in FIG. 7, an allocation order of RBs in a slot may be determined by applying the method of the disclosure, and thus the possibility of occurrence of inter-cell interference may be reduced even though data to be transmitted is smaller than 1 slot, and thus an inter-cell interference effect may be effectively removed.

As described above, the disclosure embodies detailed technical configurations that schedule traffic (downlink/uplink) in units of groups in each cell and determine an allocation order of resources (sub-frames, slots, and RBs) in a group to be different for each cell, so that an inter-cell scheduling occupancy rate is distributed as opposed to being concentrated on the same location (e.g., a first downlink/uplink slot).

Therefore, according to the disclosure, beyond the existing scheduling scheme that has a feature of having a high scheduling occupancy rate in the same location (e.g., a first downlink/uplink slot) among cells, a scheduling occupancy rate may be distributed among cells, and thus an inter-cell interference avoidance effect and a downlink/uplink transmission improvement effect may be obtained.

In the above description, as a criterion used for determining an allocation order of unit resources (sub-frames, slots, RBs) in a group, an interference level for each unit resource (sub-frame, slot, RB) measured in a corresponding cell may be used.

In addition, the disclosure may be extended to a scheme of determining an allocation order of unit resources (sub-frames, slots, RBs) in a group by using various criteria.

As an example, the disclosure may determine an allocation order of unit resources (sub-frames, slots, RBs) in a group by using information associated with a cell (e.g., a physical cell identifier (PCI)).

As another example, the disclosure may determine an allocation order of unit resources (sub-frames, slots, RBs) in a group by using a third-party external device such as a RAN intelligent controller (RIC) of an O-RAN system.

First, an example of determining an allocation order by using cell information (e.g., PCI) will be described with reference to FIG. 8.

The disclosure defines N different allocation orders in advance, and may determine an allocation order based on a result value obtained by performing an MOD N operation on the PCI (or cell ID) of a cell among the N defined allocation orders.

Figure 8:
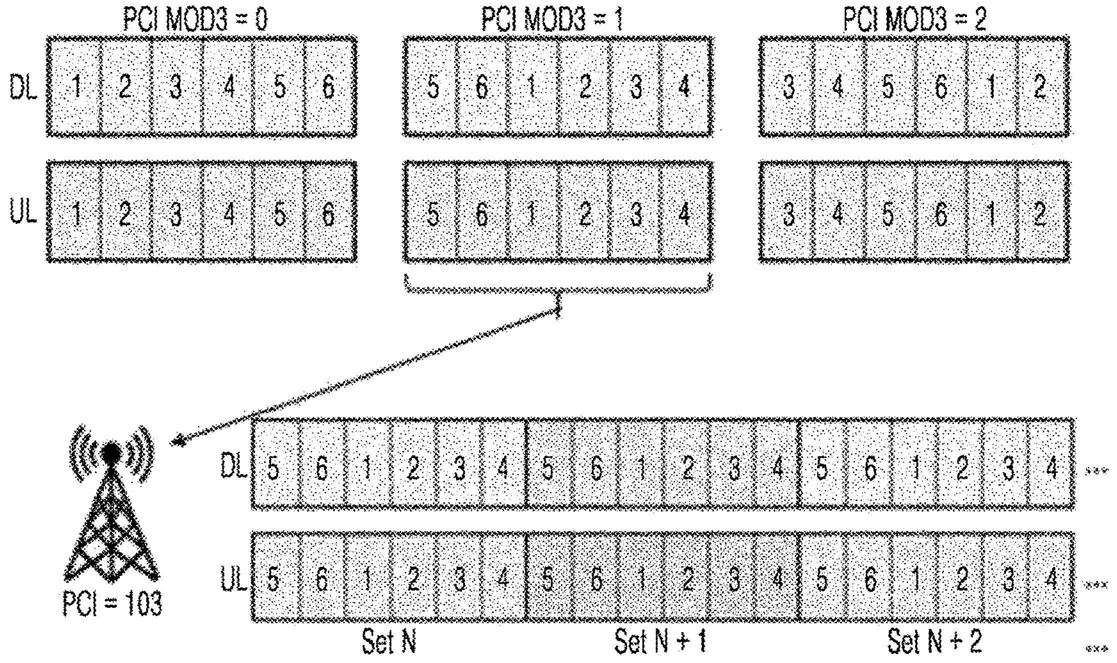
FIG. 8 is a diagram illustrating an embodiment that uses cell information (e.g., PCI) or a third-party external device according to the disclosure.

For example, FIG. 8 illustrates an embodiment in which an FDD system that configures 6 slots as a single group and three different allocation orders are defined in advance.

In this instance, on the assumption of a cell having PCI=103, 1 may be obtained as a result value obtained by performing MOD N (N=3) on PCI=103, and thus traffic (downlink/uplink) may be allocated/scheduled in units of groups (6 DL/UL slots) with respect to the corresponding cell and allocation/scheduling may be performed according to an allocation order (5, 6, 1, 2, 3, 4) defined in PCI MOD3=1 among three allocation orders (PCI MOD3=0, 1, 2) when traffic allocation/scheduling for each group is performed.

As illustrated in FIG. 8, the allocation order defined in advance may be configured in the form that maximally prevents overlapping from each other. Therefore, the probability of occurrence of interference between cells having different PCI MOD values may be lower than the case to which the proposed disclosure is not applied.

Therefore, in the case of FIG. 8, in case that the amount of data transmitted in a cell having PCI=103 is within 2 slots, interference may not affect first 2 slots of a neighboring cell having a result value obtained by performing MOD N (N=3) operation is 0 or 2.

Subsequently, an embodiment of determining an allocation order by using a third-party external electronic device (RIC) will be described with reference to FIG. 9.

Figure 9A:
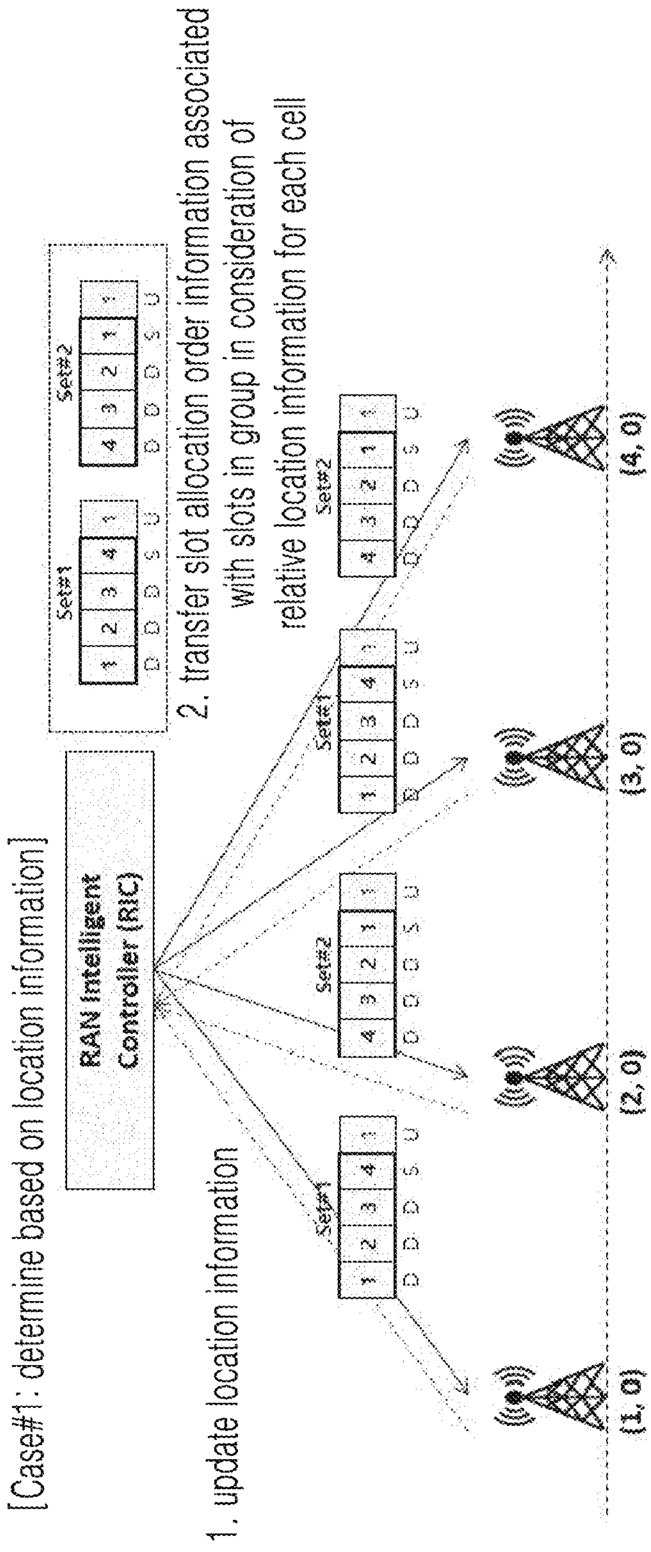
FIG. 9A is a diagram illustrating an embodiment that uses cell information (e.g., PCI) or a third-party external device according to the disclosure.

As illustrated in FIG. 9A, in the disclosure, based on geographical location information of a cell, an external device (RIC) may determine an allocation order of unit resources (sub-frames, slots, RBs) in a group for each cell (Case #1).

Figure 9B:
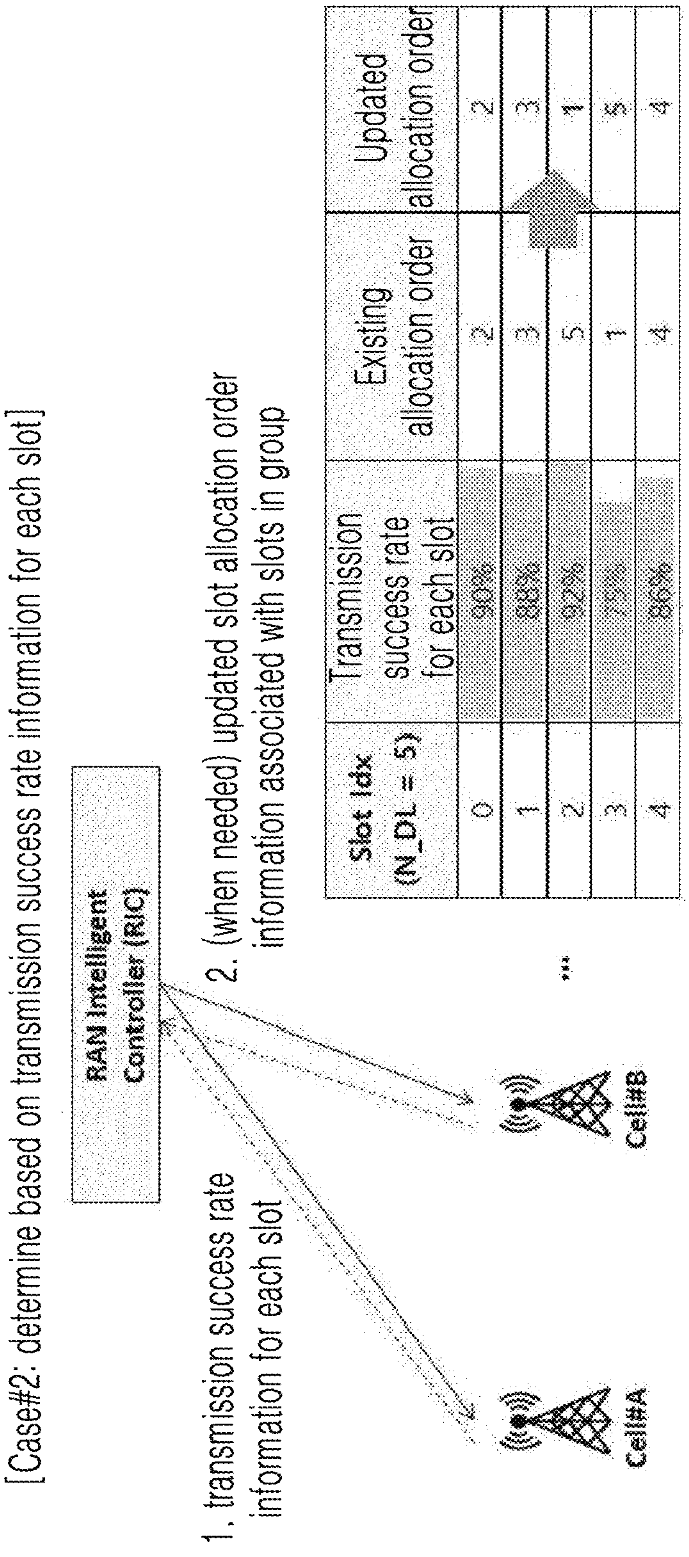
FIG. 9B is a diagram illustrating an embodiment that uses cell information (e.g., PCI) or a third-party external device according to the disclosure.

That is, as shown in case #1 of FIGS. 9A and 9B, the external device (RIC) may be aware of location information associated with each RU/cell of each base station, and based on the same, the external device (RIC) in the disclosure may determine an allocation order for each RU/cell not to overlap between neighboring cells.

Case #1 of FIG. 9A illustrates an example of determining, based on location information of cells, an allocation order of slots in two types of groups (bundles).

For ease of description, it is assumed that cells are located in one dimension, and in case #1 of FIG. 9A, allocation orders of slots are crossed and determined so that each neighboring cell has a different allocation order of slots in a group from one another, and are transferred, and thus inter-cell interference may be avoided.

As illustrated in FIG. 9B, in the disclosure, based on transmission success rate information for each slot collected from each base station (or DU), an external device (RIC) may determine an allocation order of unit resources (sub-frames, slots, RBs) in a group for each cell (case #2).

That is, as illustrated in case #2 of FIG. 9B, the external device (RIC) may collect transmission success rate information for each slot from each base station (or DU), may predict inter-cell interference based the same, and may determine an allocation order of slots in a group for each cell in a manner of reducing the interference.

Particularly, the external device (RIC) may determine an allocation order of slots in a group for each cell in a manner of updating, based on the collected transmission success rate information for each slot, an existing allocation order of slots in a group allocated to the corresponding cell.

For example, as shown in Table in case #2 of FIG. 9B, in the state in which a transmission success rate of slot index 3 is significantly decreased, in case that the existing/current turn in an allocation order is assigned with 1 that is the highest priority, the external device (RIC) may redetermine an allocation order of slots in the group by exchanging, with the turn of slot index 3, the turn of slot index 2 that has the highest transmission success rate and has the last turn in the allocation order, as an update scheme.

As described above, according to various embodiments of the disclosure, the disclosure embodies detailed technical configurations that schedule traffic (downlink/uplink) in units of groups in each cell and determines an allocation order of resources (sub-frames, slots, and RBs) in a group to be different for each cell, so that an inter-cell scheduling occupancy rate is distributed as opposed to being concentrated on the same location (e.g., a first downlink/uplink slot).

Therefore, according to the disclosure, there is provided a new scheduling scheme that distributes a scheduling occupancy rate among cells beyond the existing scheduling scheme that has a feature of having a high scheduling occupancy rate in the same location (e.g., a first downlink/uplink slot) among cells, and thus may obtain an inter-cell interference avoidance effect and a downlink/uplink transmission improvement effect.

The base station, distributed unit, radio unit, a scheduling method according to the embodiments of the disclosure may be embodied in the form of a program command executable via various computer means, and may be recorded in a computer readable medium. The computer readable medium may include a program command, a data file, a data structure, and the like independently or in combination. The program command recorded in the medium may be designed or configured especially for the disclosure or may be publicly known to those skilled in the computer software field and may be allowed to be used. Examples of a computer-readable recording medium may include a magnetic media such as a hard-disk, a floppy disk, and a magnetic tape, an optical media such as a CD-ROM, a DVD, or the like, a magneto-optical media such as a floptical disk, and a hardware device specially configured to store program commands such as a ROM, a RAM, a flash memory, and the like. The program commands may include, for example, high class language codes, which can be executed in a computer by using an interpreter or the like, as well as machine codes made by a compiler. The above-mentioned hardware device may be configured to operate as one or more software modules in order to perform operations in the disclosure, and vice versa.

Although the disclosure has been described in detail with reference to various embodiments, the disclosure is not limited to the above-described embodiments, and the technical idea of the disclosure may have the scope within which those skilled in the art field of the disclosure are capable of making various modifications or corrections without departing from the subject matter of the disclosure claimed in the following claims.

What is claimed is:

1. A base station comprising:

a processor; and a memory storing instructions thereon, the instructions when executed by the processor cause the processor to:

allocate traffic for each group of unit resources previously configured for a cell; and determine an allocation order of unit resources in the each group to be different to avoid inter-cell interference in the cell when allocating traffic for the each group.

2. A distributed unit (DU) comprising:

a processor; and a memory storing instructions thereon, the instructions when executed by the processor cause the processor to:

allocate traffic for each group of unit resources previously configured for a cell; and determine an allocation order of unit resources in the each group according to inter-cell interference in the cell when allocating traffic for the each group, wherein the processor is configured to determine the allocation order of unit resources in the each group by using an interference level of unit resource measured for the cell when allocating traffic for the each group.

3. The DU of claim 2, wherein the processor is configured to identify the interference level of unit resource in the each group based on the interference level of unit resource measured by a radio unit (RU) of the cell and determines the allocation order of unit resources in the each group based on the interference level of unit resources in the each group when allocating traffic for the each group.

4. The DU of claim 3, wherein the processor is configured to sequentially determine the allocation order of unit resources in an ascending order of interference level from a unit resource having a lowest interference level based on the interference level of unit resources in the each group.

5. The DU of claim 2, wherein the unit resource is a sub-frame, each slot in a subframe, or a resource block (RB) in a slot.

6. A radio unit (RU) interworking with a distributed unit (DU), the RU comprising:

a processor; and a memory storing instructions thereon, the instructions when executed by the processor cause the processor to:

measure an interference level of unit resource; and transfer information related to the measurement to the DU, so that the DU that allocates traffic for each group of unit resources previously configured for a cell of the RU determines an allocation order of unit resources in the each group by using the information related to the measurement when allocating traffic for the each group.

7. The RU of claim 6, wherein the information related to the measurement comprises:

information obtained by measuring an interference level of unit resource; or information obtained by calculating an interference level of unit resource in the each group using the measured interference level of unit resource.

8. A scheduling method performed by a base station, the method comprising allocating traffic for each group of unit resources previously configured for a cell, wherein the allocating comprises determining an allocation order of unit resources in the each group to be different to avoid inter-cell interference in the cell when allocating traffic for the each group.

9. A scheduling method performed by a distributed unit (DU), the method comprising allocating traffic for each group of unit resources previously configured for a cell, wherein the allocating comprises determining an allocation order of unit resources in the each group according to inter-cell interference in the cell when allocating traffic for the each group, and wherein the allocating comprises determining the allocation order of unit resources in the each group by using an interference level of unit resource measured for the cell when allocating traffic for the each group.

* * * * *